US008560663B2

(12) United States Patent
Baucke et al.

(10) Patent No.: US 8,560,663 B2
(45) Date of Patent: Oct. 15, 2013

(54) USING MPLS FOR VIRTUAL PRIVATE CLOUD NETWORK ISOLATION IN OPENFLOW-ENABLED CLOUD COMPUTING

(75) Inventors: Stephan Baucke, Milpitas, CA (US); Howard Green, San Jose, CA (US); James Kempf, Mountain View, CA (US); Mallik Tatipamula, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 150 days.

(21) Appl. No.: 13/251,107

(22) Filed: Sep. 30, 2011

(65) Prior Publication Data

US 2013/0086236 A1    Apr. 4, 2013

(51) Int. Cl.
*G06F 15/173* (2006.01)

(52) U.S. Cl.
USPC ........... 709/223; 709/225; 709/238; 709/246; 370/255; 370/389

(58) Field of Classification Search
USPC ........... 709/223, 225, 238, 246; 370/255, 389
See application file for complete search history.

(56) References Cited

U.S. PATENT DOCUMENTS

| | | | |
|---|---|---|---|
| 6,185,184 B1 * | 2/2001 | Mattaway et al. | 370/230 |
| 6,693,878 B1 | 2/2004 | Daruwalla et al. | |
| 8,194,680 B1 * | 6/2012 | Brandwine et al. | 370/398 |
| 8,356,120 B2 * | 1/2013 | Tsirkin et al. | 710/15 |
| 2003/0137536 A1 * | 7/2003 | Hugh | 345/744 |
| 2010/0103837 A1 * | 4/2010 | Jungck et al. | 370/252 |
| 2011/0271007 A1 * | 11/2011 | Wang et al. | 709/238 |
| 2012/0179855 A1 * | 7/2012 | Tsirkin et al. | 711/6 |
| 2012/0180042 A1 * | 7/2012 | Tsirkin et al. | 718/1 |
| 2012/0180043 A1 * | 7/2012 | Tsirkin et al. | 718/1 |
| 2012/0221955 A1 * | 8/2012 | Raleigh et al. | 715/736 |
| 2013/0086236 A1 * | 4/2013 | Baucke et al. | 709/223 |
| 2013/0103817 A1 * | 4/2013 | Koponen et al. | 709/223 |
| 2013/0103818 A1 * | 4/2013 | Koponen et al. | 709/223 |

OTHER PUBLICATIONS

"OpenFlow Switch Specification", Version 1.0.0 (Wire Protocol 0x01), Dec. 31, 2009, 42 pages.
"OpenFlow Switch Specification", Version 1.1.0 Implemented (Wire Protocol 0x02), Feb. 28, 2011, 56 pages.
Andersson, L. Ed., et al., "Framework for Layer 2 Virtual Private Networks (L2VPNs)", Network Working Group, RFC 4664, Category: Informational, Sep. 2006, 44 pages.

(Continued)

*Primary Examiner* — Tammy Nguyen
(74) *Attorney, Agent, or Firm* — Blakely Sokoloff Taylor & Zafman LLP

(57) ABSTRACT

Embodiments of the invention include a method performed by a cloud network manager flow entries in a cloud network. The CNM is coupled to virtualized servers for hosting virtual machines ("VM") that each comprise a virtual switch coupled to a top of rack switch ("TORS"). The CNM receives notification messages that indicate virtual machines have been scheduled for activation on virtualized servers. The CNM determines a VM media access control ("MAC") address associated with the VM and a virtual switch MAC address associated with that virtualized server's virtual switch. The CNM records an association between the VM MAC address and the virtual switch MAC address. The CNM further determines a label that associates the TORS with the virtual switch. The CNM sends a modifies flow entries in the virtual switch to indicate data packets matching the MPLS label and the VM MAC address should be forwarded to the VM.

24 Claims, 10 Drawing Sheets

(56) References Cited

OTHER PUBLICATIONS

Callon, R., et al., "A Framework for Layer 3 Provider-Provisioned Virtual Private Networks (PPVPNs)", Network Working Group, RFC 4110, Category: Informational, Jul. 2005, 82 pages.

Heller, Brandon, "Open Flow Switch Specification", Version 0.8.9 (Wire Protocol 0x97), Dec. 2, 2008, 33 pages.

Heller, Brandon, "Open Flow Switch Specification", Version 0.9.0 (Wire Protocol 0x98), Jul. 20, 2009, 36 pages.

Patrick, M., et al., "DHCP Relay Agent Information Option", Network Working Group, RFC 3046, Category: Standards Track, Jan. 2001, 14 pages.

* cited by examiner

USING MPLS FOR VIRTUAL PRIVATE CLOUD NETWORK ISOLATION IN OPENFLOW-ENABLED CLOUD COMPUTING

FIELD

Embodiments of the invention relate to the field of cloud computing; and more specifically, to virtual private network isolation in cloud computing.

BACKGROUND

Large corporations have for many years been concentrating their compute resources in data centers. This trend has accelerated over the last few years as server virtualization technology has become more and more prevalent. As data centers have become larger, some data center operators have begun to offer computing, storage, and network communication resources to outside customers. The offered services typically consist of elastic, on demand processing, storage that for most practical purposes is limited only by the customer's ability to pay, and network bandwidth into the Internet. This development is called cloud computing.

Server virtualization technology allows a pool of servers to be managed as essentially one large computer resource. A layer of software called a hypervisor sits between the operating system and the hardware. The hypervisor schedules the execution of virtual machines ("VMs") on a virtualized server. A VM is an operating system image packaged with some applications. The hypervisor allows a VM to be suspended and moved between servers to load balance. Load balancing and monitoring of VM execution to catch crashes provides the same kind of fault tolerance and scalability services for enterprise applications that are achieved at much higher cost with specialized solutions. A cloud manager system oversees the execution of VMs; scheduling execution to meet demand, to optimize server utilization, and to minimize power consumption. The cloud execution manager can schedule execution to allow in-service upgrade of hardware and software without impacting ongoing service provision.

In order to support arbitrary movement of VMs between machines, the networking within the data center must also be virtualized. Most clouds today virtualize the network by incorporating a virtual switch into the hypervisor. The virtual switch provides virtual network ports to the VMs executing under the control of the hypervisor. The virtual switch software also allows the network resources to be virtualized in a manner similar to how the server resources are virtualized by the hypervisor. The hypervisor and the virtual switch can thereby cooperate to allow VMs to be moved between servers. When the hypervisor moves a VM, it communicates with the virtual switch about the new location, and the virtual switch ensures that the network routing tables for the VM's addresses (layer 2 Media Access Control ("MAC") address, potentially also the internet protocol ("IP") address) are updated so packets are routed to the new location.

Many cloud computing facilities only support Web services applications. Web services applications consist of a load balancing front end that dispatches requests to a pool of Web servers. The requests originate conceptually from applications on the Internet and therefore the security and privacy requirements are much looser than for applications in a private corporate network. A newer trend is secure multi-tenancy, in which the cloud provider offers virtual private network ("VPN") like connections between the client's distributed office networks outside the cloud and a VPN within the cloud. This allows the client's applications within the cloud to operate in a network environment that resembles a corporate wide area network ("WAN"). For private data centers, in which services are only offered to customers within the corporation owning the data center, the security and privacy requirements for multi-tenancy are relaxed. For public data centers, the cloud operator must ensure that the traffic from multiple tenants is isolated and there is no possibility for traffic from one client to reach another. In either case, cloud computing facilities tend to implement cloud computer networks using MAC layer virtual local area networks ("VLANs").

For example, two Virtual Private Clouds ("VPCs") can be set up for two different external enterprise customers. A VPC consists of a collection of VMs, storage, and networking resources that provide secure multi-tenancy to the enterprises renting space in the cloud. The enterprise customers connect into the VPCs via VPNs over the Internet running on public operator network.

In order to add a new service instance (a new VM) to a VPC, a cloud execution manager initializes the VM to run on a hypervisor on a virtualized server. The virtual switch on the virtualized server is configured to include the VM in a VLAN that is part of the VPN for the enterprise adding the new VM. In some cases, a virtual customer edge router is updated for the new service and a provider edge router in the cloud computing facility is updated with the new service.

In order to provide VPNs, cloud computing facilities implement one of three solutions. First, each tenant receives a separate VLAN slice. Second, tenant VPNs are implemented using IP encapsulation. Third, tenant VPNs are implemented using MAC address encapsulation. Each of these solutions suffer from deficiencies.

If the cloud uses VLAN isolation, each tenant is assigned a separate VLAN tag and the cloud network is run as a flat Layer 2 network. The VLAN tag has 12 bits, so if a cloud operator uses VLAN isolation the number of tenants is restricted to 4096. This limit provides may prove a major limitation.

Another problem with VLAN isolation is that standard area networking (e.g., LAN, WAN, MAN; Institute of Electrical and Electronics Engineers ("IEEE") 802.1) switching uses the spanning tree protocol ("STP") to set up routes. In order to remove the possibility of routing loops, STP designates one and only one path between a source address and a destination address, regardless of whether there are multiple routes. This can lead to congestion and underutilization of the switching fabric when the spanning tree route comes under traffic pressure and alternate routes are neglected.

With IP encapsulation, the cloud is run as a routed IP network and IP tunnels are used to isolate tenant's traffic. The traffic from a tenant is encapsulated in an IP packet (typically using Generic Routing Encapsulation ("GRE")) with the endpoints of the tunnel being the source and destination virtual switches on the source and destination virtualized servers where the VMs are running.

IP encapsulation allows a client to define an arbitrary layer 2 service on top by encapsulating Ethernet frames in Layer 2 Tunneling Protocol ("L2TP"). It also allows large numbers of tenants, constrained only by the cloud-wide IP address space. The tenant can also deploy their own IP address space on top of the IP tunnels. However, without other measures, IP routing also selects a single route and so multipath routes are neglected, leading to unnecessary congestion. The cloud routing can utilize Equal Cost Multipath to spread packets over multiple links but at the cost of additional configuration complexity.

In general, configuring an IP routed network is time consuming and routers tend to be more expensive devices than simple switches. In addition, IP networks have limited means to provision dedicated bandwidth, which might be necessary for large data flows.

With MAC encapsulation, the separate tenant VPNs are run as encapsulated inside MAC tunnels, similar to IP encapsulation. The endpoints of the MAC tunnels are typically the virtual switches on the source and destination virtualized servers where the VMs are running.

MAC encapsulation offers similar benefits to IP encapsulation over VLAN isolation, with the added benefit that the cloud can be run as a flat Layer 2 network if desired. The disadvantage is that there are few standards for the signaling protocols for MAC encapsulation, unlike IP, and, although there are standards for data plane encapsulation, they are not used in some existing cloud management software products. This runs the risk of not working with certain types of hardware. Configuring and maintaining a MAC encapsulation network is also more complex than maintaining a VLAN isolated network.

SUMMARY

Embodiments of the invention include a method performed by a cloud network manager ("CNM") to manage multi-protocol label switching ("MPLS") flow entries in a cloud network. The CNM is coupled to a first virtualized server for hosting one or more virtual machines ("VM"), wherein the first virtualized server comprises a first virtual switch that supports MPLS and the first virtual switch is coupled to a first top of rack switch ("TORS") that supports MPLS. The CNM receives a first notification message, wherein the first notification message indicates that a first VM has been scheduled for activation on the first virtualized server. In response to receiving the first notification message, the CNM determines a first VM media access control ("MAC") address associated with the first VM. Further the CNM determines a first virtual switch MAC address associated with the first virtual switch. The CNM records, in an address mapping table, an association between the first VM MAC address and the first virtual switch MAC address. The CNM further determines a first MPLS label that associates the first TORS with the first virtual switch. The CNM sends a first flow entry modification message to the first virtual switch indicating that data packets matching the first MPLS label and the first VM MAC address should be forwarded the first VM.

Embodiments of the invention include a system for managing a multi-protocol label switching ("MPLS") cloud network including a plurality of top of rack switches ("TORS"), a plurality of virtualized servers, a cloud execution manager ("CEM") coupled to the plurality of virtualized servers, and a cloud network manager ("CNM") coupled to the plurality of TORSs.

The plurality of virtualized servers each coupled to one of the plurality of TORSs and comprising a hypervisor and a virtual switch. The hypervisor configured to execute one or more virtual machines ("VM") on the virtualized server. The virtual switch configured to support MPLS and to transmit data packets from the one or more VMs to the TORS coupled with this virtualized server.

The CEM is coupled to the plurality of virtualized servers. Further the CEM schedules execution of the one or more VMs, each VM to be executed on one of the plurality of virtualized servers. The CEM further suspends execution of the one or more VMs and moves execution of the one or more VMs from one of the plurality of virtualized servers to another one of the plurality of virtualized servers.

The CNM is coupled to the plurality of TORSs, the plurality of virtualized servers, and the CEM. The CNM receives a first notification message from the CEM, wherein the first notification message is to indicate that a first VM has been scheduled for activation on a first of the plurality of virtualized servers. In response to the first notification message, the CNM performs the follow. The CNM determines a first VM media access control ("MAC") address associated with the first VM. The CNM determines first virtual switch MAC address associated with the first virtual switch in the first virtualized server. The CNM records, in an address mapping table, an association between the first VM MAC address and the first virtual switch MAC address. The CNM determines a first MPLS label to associate a first TORS with the first virtual switch, wherein the first TORS is to be coupled with the first virtualized server. The CNM send a first flow entry modification message to the first virtual switch to indicate that data packets that match the first MPLS label and the first VM MAC address should be forwarded the first VM.

Embodiments of the invention include a cloud network manager ("CNM") for managing multi-protocol label switching ("MPLS") flow entries in a cloud network. The CNM is coupled to a first virtualized server for hosting one or more virtual machines ("VM") wherein the first virtualized server comprises a first virtual switch that supports MPLS and the first virtual switch is coupled to a first top of rack switch ("TORS") that supports MPLS. The receives a first notification message, wherein the first notification message is to indicate that a first VM has been scheduled for activation on the first virtualized server. In response to the first notification message, the CNM determines a first VM media access control ("MAC") address associated with the first VM. The CNM further determines a first virtual switch MAC address associated with the first virtual switch and records, in an address mapping table, an association between the first VM MAC address and the first virtual switch MAC address. The CNM determines a first MPLS label to associate the first TORS with the first virtual switch, and sends a first flow entry modification message to the first virtual switch to indicate that data packets that match the first MPLS label and the first VM MAC address should be forwarded the first VM.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
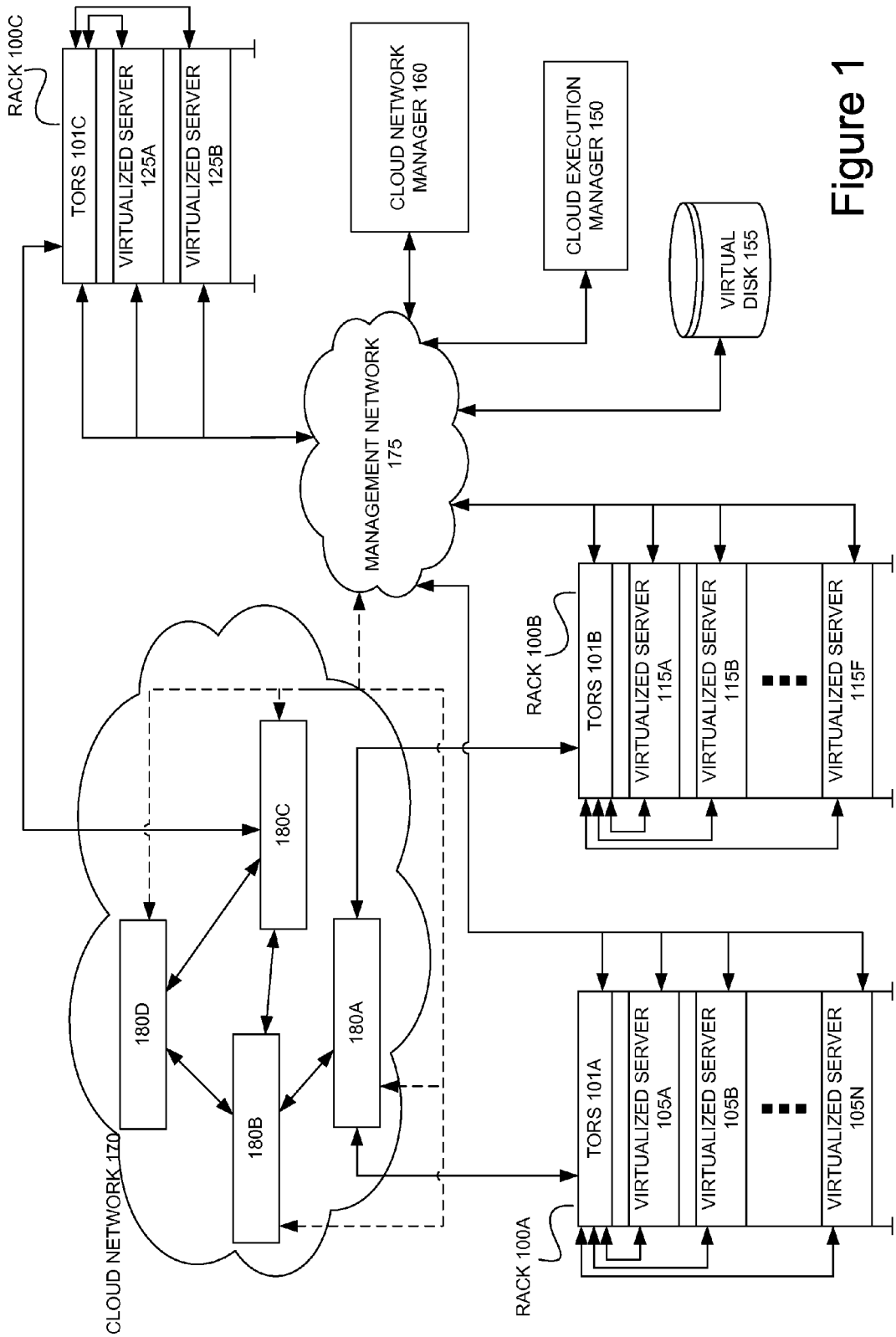
FIG. 1 illustrates components in a cloud computing facility according to one embodiment of the invention.

The following description describes methods and apparatus for managing multi-protocol label switching ("MPLS") flow entries in a cloud network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

The techniques shown in the figures can be implemented using code and data stored and executed on one or more electronic devices. Such electronic devices store and communicate (internally and/or with other electronic devices over a network) code and data using non-transitory tangible machine readable medium (e.g., magnetic disks; optical disks; read only memory; flash memory devices; phase-change memory) and transitory machine-readable communication medium (e.g., electrical, optical, acoustical or other forms of propagated signals-such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible machine readable medium and transitory machine-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

In embodiments of the invention, a cloud computer facility uses MPLS to form VPNs for VPC tenants, and programs flow routes in the virtual switch and top of rack switch. For example, MPLS switches can program flow routes with OpenFlow as described in OpenFlow Switch Specification Version 1.1.0, February 2011. A virtual switch uses Ethernet MAC addresses to route packets to VMs on a virtualized server, and to classify packets into particular MPLS label switch paths ("LSPs"), but after the virtual switch, neither Ethernet nor IP addresses are used for routing. Instead, routing is done strictly using MPLS labels that are assigned based on the IP and MAC destination addresses. The process is similar to but not identical with the Virtual Private Wire Service ("VPWS") or Layer 3 VPNs ("L3VPNs") in wide area networks. "Framework for Layer 2 Virtual Private Networks (L2VPNs)," Internet Engineering Task Force ("IETF"), Request For Comments ("RFC") 4664, describes VPWS for wide area networks, while "A Framework for Layer 3 Provider-Provisioned Virtual Private Networks (PPVPNs)," IETF, RFC 4110 describes L3VPNs.

For example, a Cloud Network Manager ("CNM") installs flow routes using OpenFlow into a Virtual Switch on a virtualized server where a VM is running. The flow routes encapsulate Ethernet frames from tenant VMs on the virtualized server with an MPLS label designating the route and specific to the tenant between the TORS and a virtual switch on the destination side. The packets are then forwarded to the source VM's virtualized server's TORS. The source TORS then routes the packets into the data center network fabric. If the cloud network fabric is an MPLS network, the source TORS pushes another MPLS label which specifies the route between the source TORS and the destination TORS. The destination TORS pops the MPLS routing label and uses the label pushed on by the source virtual switch to route the packet to the appropriate destination server and virtual switch. The destination virtual switch pops the TORS to virtual switch label and forwards the packet to the correct VM based on the destination MAC address. If the cloud switch fabric supports some other technology, such as optical, the TORS performs a suitable adaptation.

Embodiments of the invention provide numerous advantages. For example, no IP routing is required on the data plane thereby removing the cost, power usage, and complexity of having an IP routed cloud network. The design only requires inexpensive MPLS switches. The switch fabric in the cloud can be a standard Ethernet switch, an MPLS capable switch, an optical circuit-switch, or even a mixture, for example, optical for high capacity flows and electrical for other traffic. The switch fabric could even be a wide area network between distributed computing resources. The TORS handles the encapsulation appropriately. The number of tenants that can be supported is not limited to the size of MPLS label space. The tenant can manage its own IP address space (if desired) and DNS server (if desired). Routing details into the cloud switch fabric are handled by the TORS where the right mix of scalability and aggregation can be achieved.

FIG. 1 illustrates components in a cloud computing facility according to one embodiment of the invention. The cloud computing facility with a comprises a plurality virtualized servers in a plurality of racks coupled through a cloud network 170. Of these virtualized servers and racks, three racks 100A, 1008, and 100C are illustrated. Each illustrated rack comprises a top of rack switch ("TORS") and a plurality of virtualized servers. Rack 100A comprises a TORS 101A and a plurality of virtualized servers 105A-105N. Rack 100B comprises a TORS 1018 and a plurality of virtualized servers 115A-115N. Rack 100C comprises a TORS 101C, virtualized server 125A, and virtualized server 125B. Each TORS 100A-100C couples the plurality virtualized servers within that rack and is further coupled with a cloud network 170. The structure of the cloud network 170 can support any type of switching or routing protocol, for example an optical circuit-switched network or a network of OpenFlow MPLS switches. The cloud network 170 could even be a wide area network ("WAN") that runs between distributed server racks. The connectivity in the figure is not meant to be normative, there are many ways to couple TORS in a cloud network 170. In FIG. 1, the cloud network 170 comprises a plurality of switching elements (e.g. switches or routers) 180A-180D.

Each TORS 100A-100C and each virtualized server 105A-105N, 115A-115N, 125A, and 125B is further coupled with a management network 175. The management network 175 couples the TORSs and the virtualized servers with management elements. The management elements comprise a cloud execution manager 150, a virtual disk 155, and a cloud network manager 160.

The cloud execution manager ("CEM") 150 schedules VMs for execution, and includes an Object Manager for mapping VMs into and out of the virtual disk 155 which provide permanent storage for each VM's image. A cloud network manager ("CNM") 160 manages the VPNs for the tenants VPCs.

Figure 2:
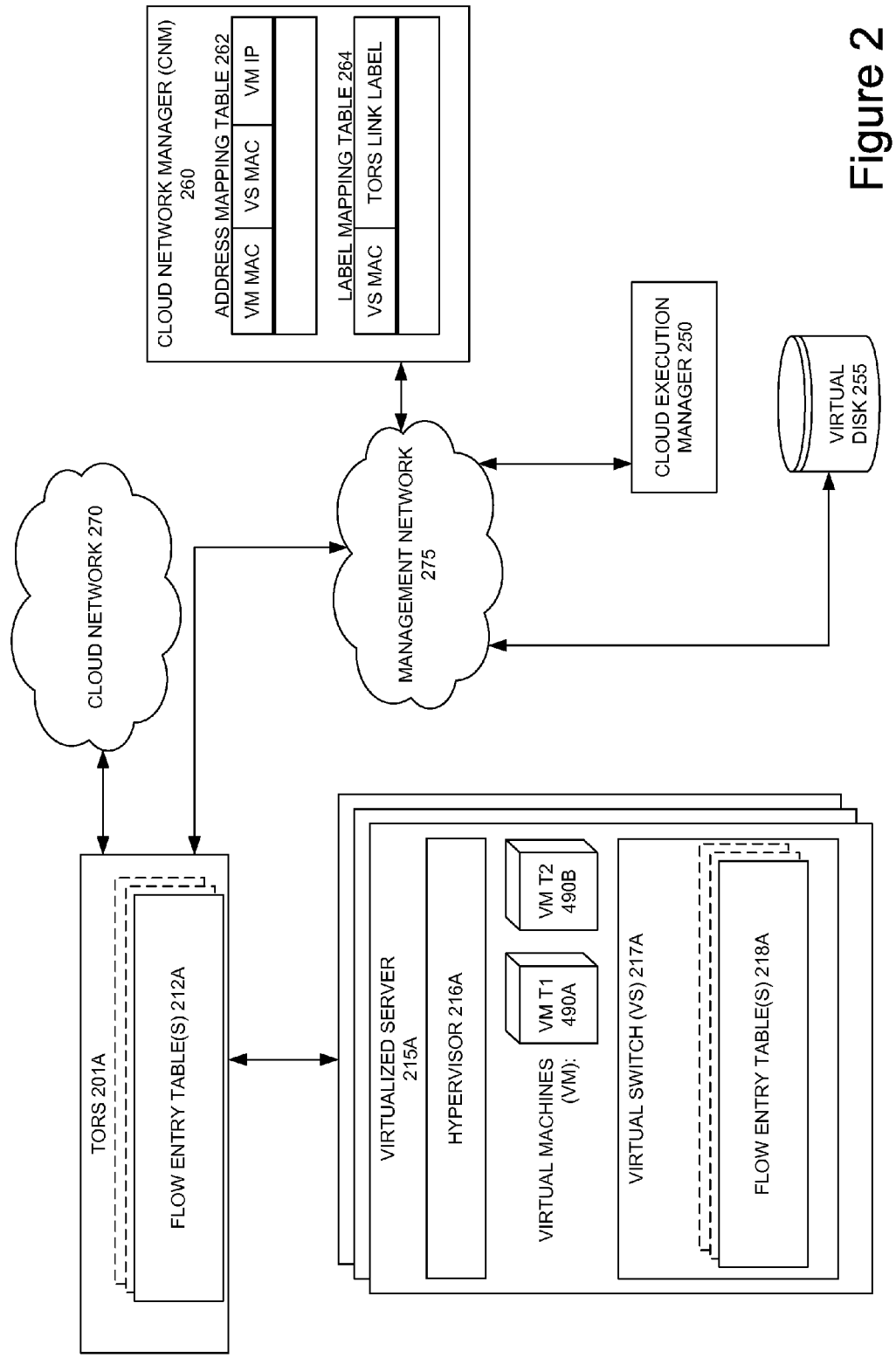
FIG. 2 illustrates components in a cloud computing facility according to one embodiment of the invention.

FIG. 2 illustrates components in a cloud computing facility according to one embodiment of the invention. FIG. 2 shows a TORS 201A that comprises one or more flow entry tables 212A-Z. The flow entry tables 212A-Z used to match MPLS labels with MPLS actions as described with reference to OpenFlow. The TORS 201A is coupled with one or more virtualized servers 215A-N.

Each virtualized server 215A-N is configured to execute one or more VMs. In FIG. 2, the virtualized server 215A comprises a hypervisor 216A which schedules the execution of VMs (e.g., VM T1 and VM T2). The virtualized server 215A further comprises a virtual switch 217A. The virtual switch 217A provides virtual network ports to the VMs executing under the control of the hypervisor. The virtual switch 217A is an MPLS enabled switch that comprises one or more flow entry tables 218A-Z used to match MPLS labels with MPLS actions as described with reference to OpenFlow.

The TORS 201A is coupled with a cloud network 270 such as the cloud network described in FIG. 1. The TORS 201A is further coupled with a management network 275. As in FIG. 2, the management network 275 couples the TORSs and the virtualized servers with management elements such as a CEM 250, a virtual disk 255, and a CMN 260. The CMN 260 comprises tables describing the VPN including an address mapping table 262 and a label mapping table 264. The address mapping table 262 maps between the MAC address of a VM, the MAC address of the virtualized server (which is the virtual switch's 217A MAC address) that is running the VM, and the VM's IP address. The label mapping table 264 maps the virtualized server's 215A MAC address (which is the virtual switch's 217A MAC address) to a TORS link label for the link between the virtual switch 217A and TORS 201A. In other embodiments, the CNM 260 keeps track of which Dynamic Host Configuration Protocol ("DHCP") and Domain Name Service ("DNS") (if any) servers belong to which tenant.

In one embodiment, the CNM assumes that tenant VMs are well behaved with respect to how they configure their IP stacks and that they do not arbitrarily change their IP/MAC addresses. If a tenant VM misbehaves and make such a change, its packets will be routed to the CNM and the CNM will inform the CEM. The CEM can then shut down the offending VM.

Figure 3:
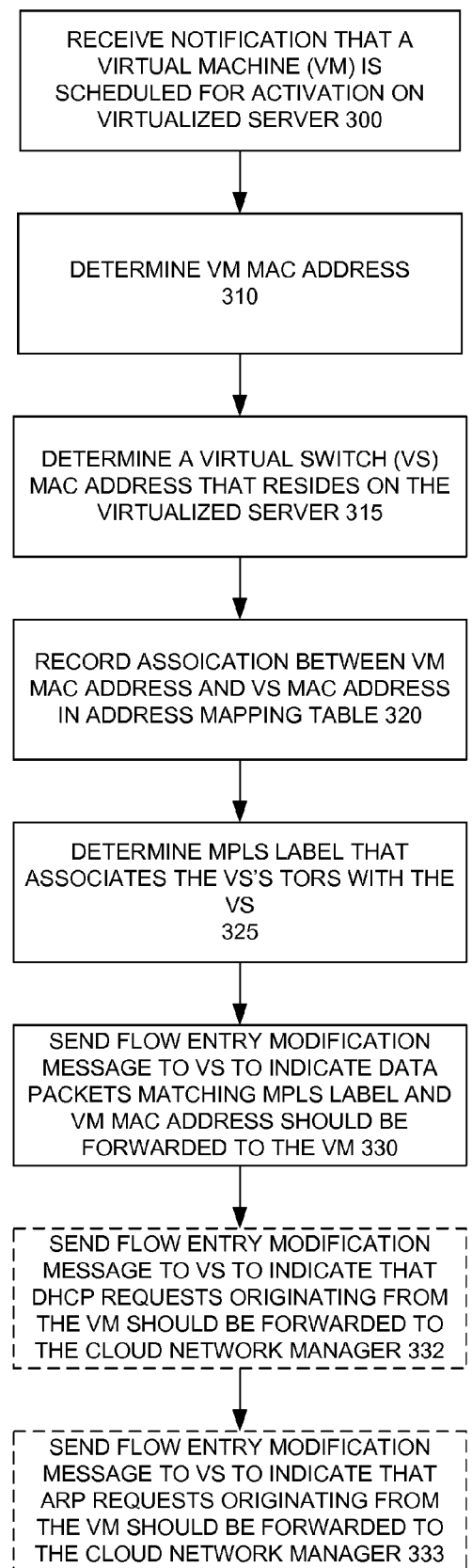
FIG. 3 illustrates a block diagram of a method for activating a virtual machine according to one embodiment of the invention.

FIG. 3 illustrates a block diagram of a method for activating a virtual machine according to one embodiment of the invention. In block 300, a CNM receives notification that a VM is scheduled for activation on a virtualized server. For example, a CEM notifies the CNM that the CEM has schedule the VM for activation. The CNM determines the VM's MAC address in block 310. In one embodiment, the CEM provides the CNM with the VM's MAC address along with the notification while in another embodiment the CEM provides the CNM with the VM's MAC address in a separate message. In block 315, the CNM determines a virtual switch's MAC address corresponding with the virtual switch that resides on the virtual server on which the VM will be activated. In block 320, the CNM records an association between the VM's MAC address and the virtual switch's MAC address in the CNM's address mapping table. The CNM further determines, in block 325, an MPLS label that associates a the virtual switch with the TORS that is coupled with the virtual switch. In block 330, The CNM 330 sends a flow entry modification message to the virtual switch to indicate that data packets matching the MPLS label and the VM's MAC address should be forwarded to the VM. In one embodiment, the CNM sends a flow entry modification message, in block 332, to the virtual switch to indicate that DHCP requests originating from the VM should be forwarded to the CNM. In another embodiment, the CNM sends a flow entry modification message, in block 333, to the virtual switch to indicate that Address Resolution Protocol ("ARP") requests originating from the VM should be forwarded to the CNM.

Figure 4:
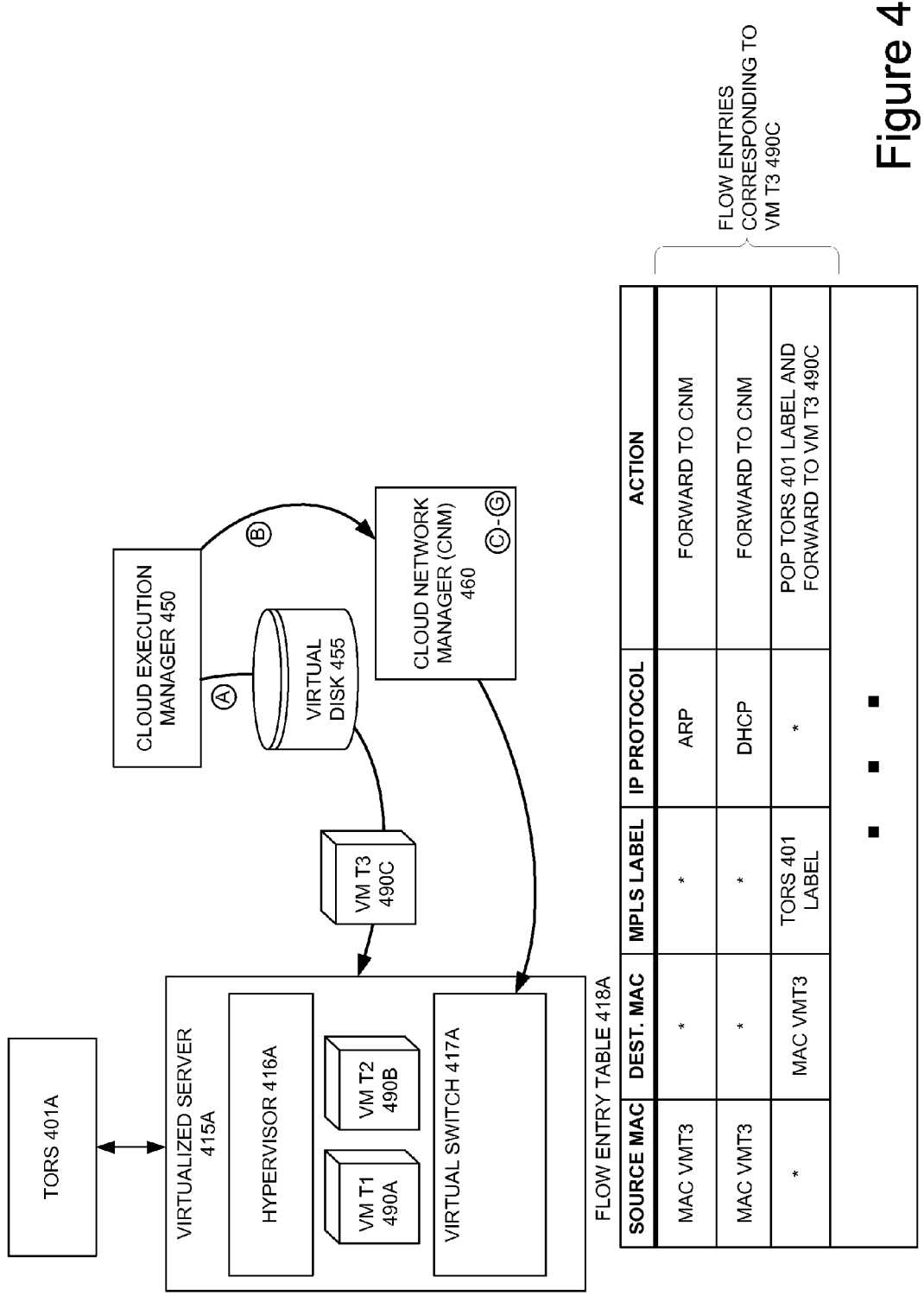
FIG. 4 illustrates a method for activating a virtual machine according to one embodiment of the invention.

FIG. 4 illustrates a method for activating a virtual machine according to one embodiment of the invention. In FIG. 4, a TORS 401A is coupled with a virtualized server 415A. The virtualized server 415A comprises a hypervisor 416A and a virtual switch 417A. In FIG. 4, the virtualized server 415A has two active VMs T1 and T2 490A and 490B. Further, FIG. 4 shows a CEM 450, a virtual disk 455, and a CNM 460.

In FIG. 4, the CEM 450 is scheduling a third VM T3 490C for execution on the virtualized server 415A. This figure illustrates various points during the activation of a virtual machine. At point A, the CEM 450 schedules the VM T3 490C, e.g. a VM belonging to Tenant 1 for execution. The object file is mapped from the virtual disk 455 through the CEM's Object Manager. The CEM edits the VM 490C stack to set the VM's 490C MAC address to one of the MAC addresses assigned to Tenant 1. At point B, The CEM 450 informs the CNM 460 of the activation. It provides the CNM 460 with the MAC address of the VM 490C and the MAC address of the virtualized server 415A on which the VM executes (which is the MAC address of the virtualized server's 415A virtual switch 417A).

At point C, The CNM 460 records the MAC address of the VM 490C in the CNM's address mapping table (not shown) along with the MAC address of the virtualized server 415A on which it has been scheduled. At point D, The CNM 460 looks up the virtual switch to TORS 401A MPLS label for the link between the virtualized server 415A on which the VM 490C is running and the TORS 401A (this is also known as the source TORS "STORS" link label) from the CNM 460 label mapping table. At point E, the CNM 460 sends a flow entry modification message to the MPLS enabled virtual switch 217A to install a rule that matches the VM's 490C MAC and the STORS link label with an action to pop the STORS link label and forwards the packet to the VM 490C.

In one embodiment, the CNM 460 sends a second flow entry modification message, at point F, to the virtual switch 217A to install the following rule. If the source MAC matches the MAC address for VM 490C and the protocol is ARP, route the packet to the CNM 460 to allow the CNM 460 to service the ARP request. This rule reduces the ARP traffic and allows the CNM 460 to answer from the CNM address mapping table.

In another embodiment, the CNM 460 sends a third flow entry modification message, at point G, to the virtual switch 217A to install the following rule. If the source MAC matches the MAC address for VM 490C and the protocol is DHCP, route the packet to the CNM 460 to allow the CNM 460 to service the DHCP request. This rule allows the CNM 460 to record a MAC address to IP address mapping in the CNM address mapping table by intercepting the reply packet from a DHCP server.

FIG. 4 illustrates three entries in a flow entry table 18A of the virtual switch 417A assuming that all three previously described flow entry modification messages were communicated. The flow entry table 18A has five columns illustrated: a source MAC, destination MAC, MPLS label, IP protocol, and action. The flow entries correspond to the activation of 490C.

The first entry in flow entry table 418A illustrated matches the MAC address of VM T3 490C as a source MAC address. The destination MAC address and MPLS label are set to match any entry while the IP protocol is set to match on the ARP protocol. The action is then to forward to CNM 460. This rule corresponds with step F described above.

The second entry in flow entry table 418A illustrated matches the MAC address of VM T3 490C as a source MAC address. The destination MAC address and MPLS label are set to match any entry while the IP protocol is set to match on the DHCP protocol. The action is then to forward to CNM 460. This rule corresponds with step G described above.

The third entry in flow entry table 418A illustrated matches all MAC addressed as a source MAC address. The destination MAC address is set to match the MAC address of VM T3 490C while the MPLS label is set to the TORS 401 label. The IP protocol is set to match on all entries. The action is then to pop the MPLS label and forward the packet to VM T3 490C. This rule corresponds with step E described above.

As described above, a CNM maintains a mapping between a VM MAC address, virtualized server MAC, and VM IP address. If a tenant has elected not to use DHCP addresses, then the CEM modifies the VM's IP stack prior to execution scheduling and installs a static IP address. However, in other embodiments a tenant will elect to use DHCP addresses. In such a case, the CNM will intercept DHCP requests and act as a relay in accordance with "DHCP Relay Agent Information Option," IETF, RFC 3046, January 2001.

Figure 5:
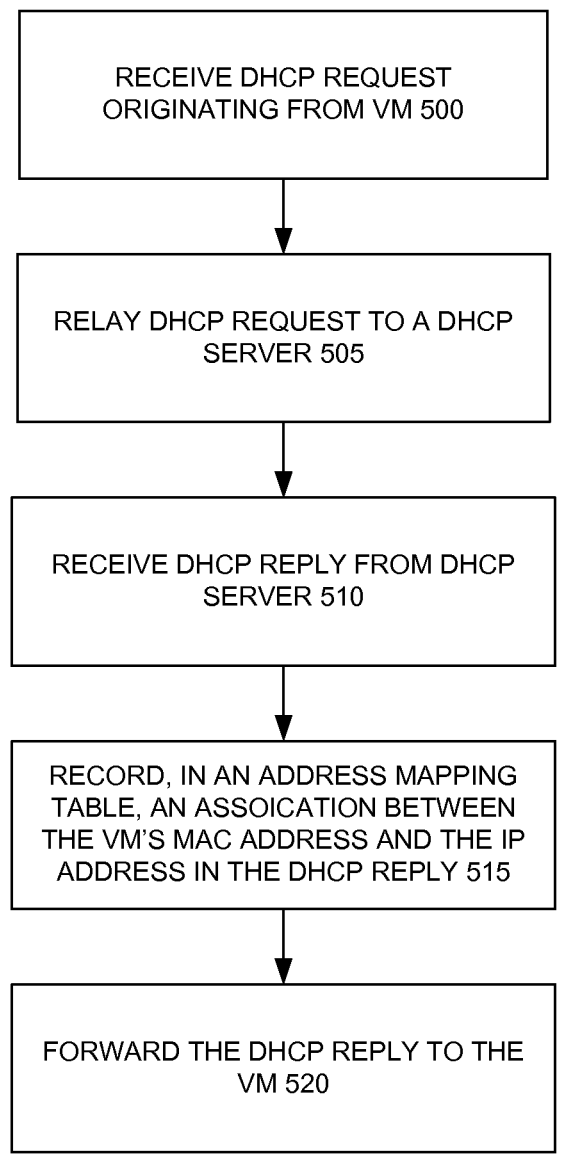
FIG. 5 illustrates a block diagram of a method for intercepting DHCP requests from a VM according to one embodiment of the invention.

FIG. 5 illustrates a block diagram of a method for intercepting DHCP requests from a VM according to one embodiment of the invention. At block 500, the CNM receives the DHCP request that originated from a VM. The CNM relays the DHCP request to a DHCP server in accordance with RFC 3046 at block 505. At block 510, the CNM receives a DHCP reply from the DHCP server. At block 515, the CNM records an association in an address mapping table between the VM's MAC address and the IP address received in the DHCP reply. In accordance with embodiments of the invention, the association further includes the MAC address of the virtual server executing the VM. At block 520, the CNM forwards the DHCP reply to the VM.

Figure 6:
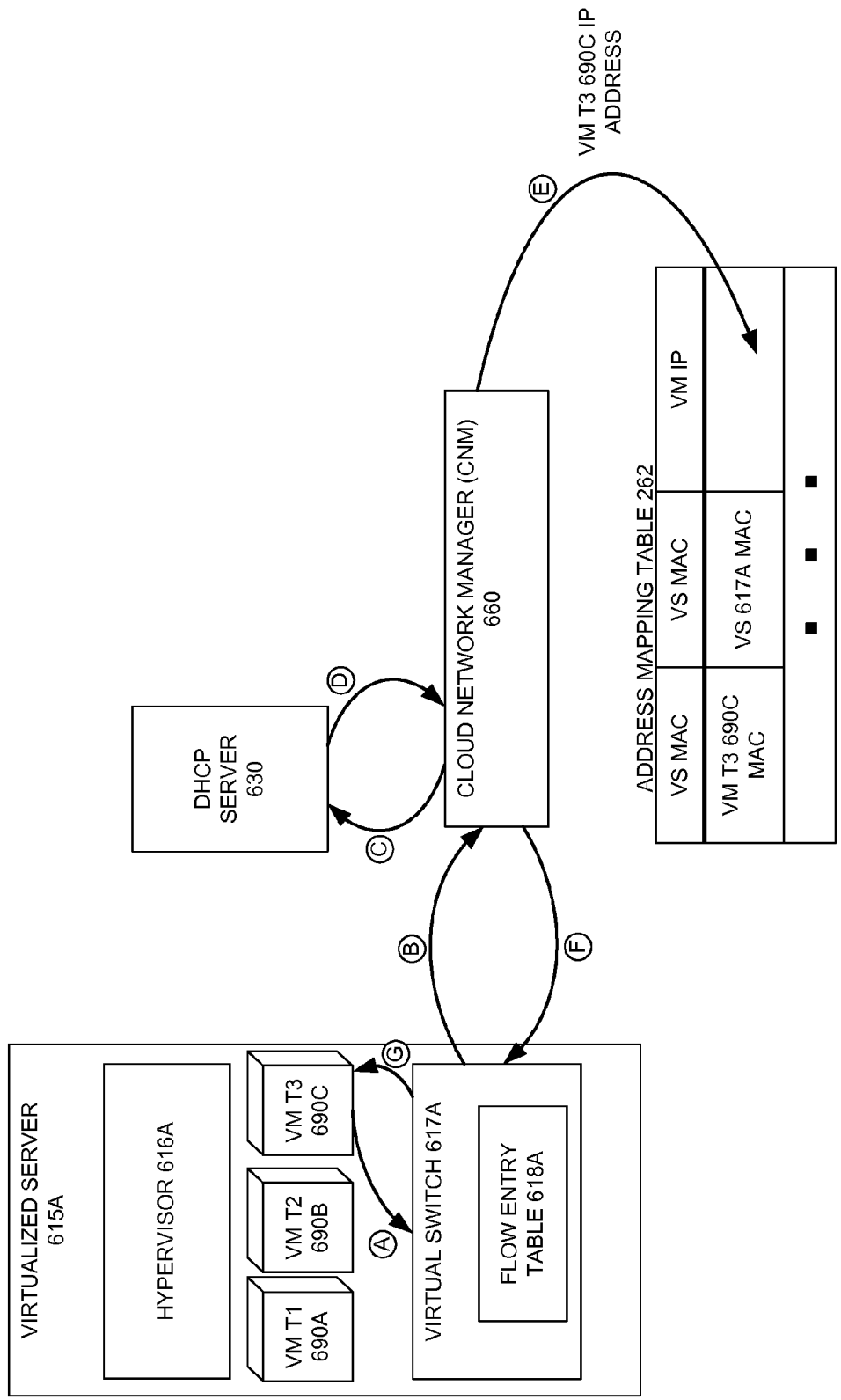
FIG. 6 illustrates a method for intercepting DHCP requests from a virtual machine according to one embodiment of the invention.

FIG. 6 illustrates a method for intercepting DHCP requests from a virtual machine according to one embodiment of the invention. In FIG. 6, a virtualized server 615A comprises a hypervisor 616A and a virtual switch 617A. In FIG. 6, the virtualized server 615A has three active VMs T1, T2, and T3 690A-690C. The virtual switch 617A comprises a flow entry table 618A that includes a rule to forward DHCP requests from VM T3 690C to a CNM 660 which is coupled with a DHCP server 630.

This figure illustrates various points during the interception of a DHCP request from a virtual machine. At point A, the VM T3 690C issues a DHCP Request to obtain an IP address and other configuration information, such as the DNS server. At point B, the virtual switch 617A matches the request with a flow rule to route the DHCP request to the CNM 660. At point C, the CNM 660 acts as a DHCP relay, inserts a standard DHCP Relay Option, and forwards the request to the tenant's DHCP server 630. The CNM 660 can determine which tenant the VM T3 690C belongs to by examining the source MAC address of the DHCP request. At point D, The tenant's DHCP server 630 responds with a DHCP Reply containing an IP address for the VM T3 690C and other configuration information. At point E, the CNM 660 records the mapping between the VM T3 690C MAC address and the IP address in the CNM's address mapping table 262. At point F, the CNM 660 strips off the DHCP Relay Option and forwards the DHCP replay to the virtual switch 617A which forward the request back to VM T3 690C at point G.

In the typical IP LAN scenario, a source application running in a server wishing to communicate with a destination application uses DNS to discover the IP address of the destination application. After the IP address is found, the IP stack in the source server broadcasts an ARP message to discover a mapping between the IP address and the MAC address of the destination. If the destination is on the local LAN, it replies to the ARP. If the destination is not running on the local LAN, the source server IP stack uses the MAC address of a local router as a gateway to other subnets.

In the cloud, VMs run on top of a virtualized LAN. The tenant runs its own DNS server, or buys DNS service from the cloud operator. A VM is configured with the address of the DNS server it is to use. When the tenant wants to contact a service, it sends a DNS request to the DNS server to discover the IP address, exactly as in a normal corporate LAN. The DNS server can be under control of the cloud operator or it can be controlled by the individual tenant. When the DNS reply returns, the VM broadcasts an ARP request to determine the IP to MAC address mapping.

In embodiments of the invention, a virtual switch intercepts the ARP message and relays it to a CNM rather than broadcasting it. The CNM provides an address mapping service so that the ARP messages do not need to be broadcast throughout the cloud network.

Figure 7:
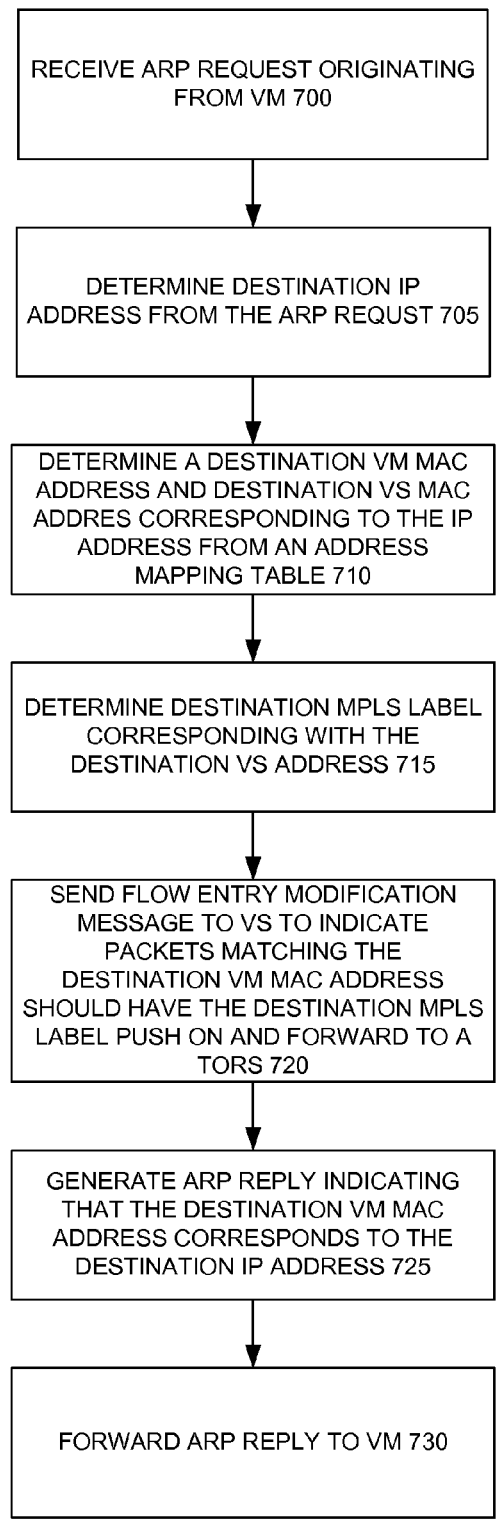
FIG. 7 illustrates a block diagram of a method for intercepting ARP requests from a VM according to one embodiment of the invention.

FIG. 7 illustrates a block diagram of a method for intercepting ARP requests from a VM according to one embodiment of the invention. At block 700, a CNM receives an ARP request that originated from a VM. The CNM determines the destination IP address from the ARP request at block 705. At block 710, the CNM determines a destination VM MAC address and destination virtual switch MAC address corresponding to the IP address. For example, the CNM can look up the mapping from the CNM's address mapping table based on the IP address within the ARP request. At block 715, the CNM determines a destination MPLS label that corresponds with the destination virtual switches MAC address. At block 720, the CNM sends a flow entry modification message to the virtual switch on the virtual server that is executing the source VM. The entry modification message indicates that packets matching the destination VM MAC address should have the destination MPLS label pushed on and get forwarded to a TORS for the source virtual switch. At block 725, the CNM generates an ARP reply indicating the destination VM MAC address corresponds to the destination IP address. The CNM forwards the ARP reply to the source VM in block 730.

Figure 8:
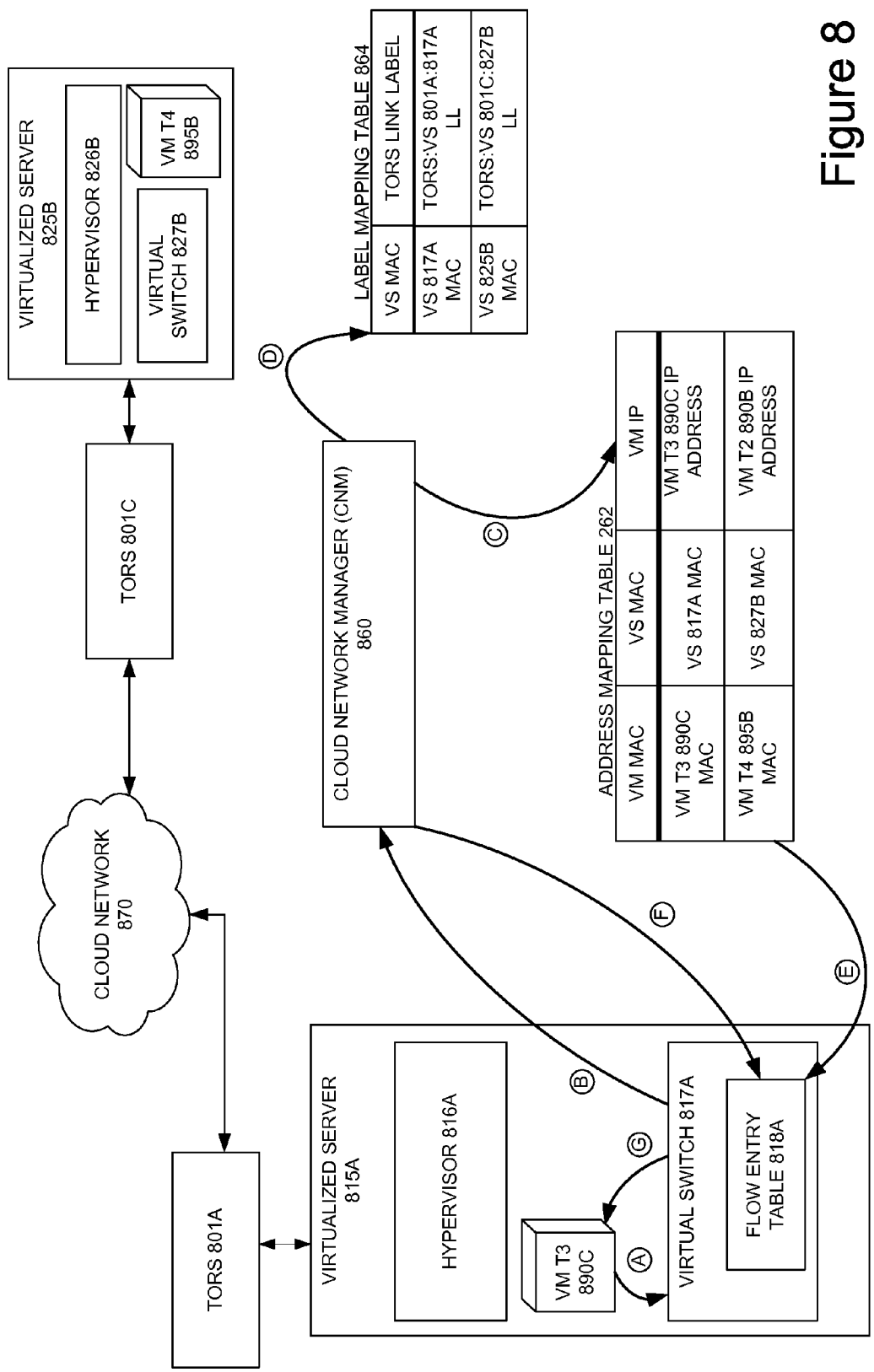
FIG. 8 illustrates a method for intercepting ARP requests from a virtual machine according to one embodiment of the invention.

FIG. 8 illustrates a method for intercepting ARP requests from a virtual machine according to one embodiment of the invention. In FIG. 8, a virtualized server 815A comprises a hypervisor 816A and a virtual switch 817A. In FIG. 8, the virtualized server 815A has an active VM T3 890C. The virtual switch 817A comprises a flow entry table 818A that includes a rule to forward ARP requests from VM T3 890C to a CNM 860. The virtualized server 816A is coupled with a TORS 801 that is coupled to another TORS 801C through a cloud network 870. The TORS 801C is coupled with a virtualized server 825B that comprises a hypervisor 826B and virtual switch 827B. The virtualized server 825B is executing VM T4 895B.

This figure illustrates various points during the interception of an ARP request from a VM T3 890C. At point A, the VM T3 890C broadcasts an ARP request. The rest of the interception assumes that the ARP request indicates the IP address of a destination VM T4 895B that resides on the virtual server 825B. The virtual switch 817A intercepts the ARP request and matches the request to a rule in the flow entry table 818A that routes the ARP request to the CNM 860 at point B.

At point C, the CNM 860 uses the requested destination IP address ("DIP") as a key to look up a destination MAC address ("DMAC") in the CNM's address mapping table 262. If the DIP is not present, the destination is not within the cloud and the CNM does not reply to the ARP request. The VM will then use the MAC address of the local router provided. If the DIP address is present in the CNM's address mapping table 862, then the CNM 860 retrieves the DMAC VM address and the DMAC virtualized server address. In this case, the CNM will retrieve VM T4's 895B MAC as the DMAC VM address and virtual switch 827B MAC as the DMAC virtualized server address.

At point D, the CNM looks up the MPLS flow label for the link between the destination TORS and the DMAC virtualized server address from the CNM's label mapping table 864, also known as a destination TORS ("DTORS") link label. This flow label describes the route between the TORS 801A and the virtualized server at the DMAC virtualized server. In this case, the label TORS:VS 801C:827B LL will be retrieved to indicate a route to the TORS 801C from TORS 801A.

At point E, the CNM 860 installs a flow route in the virtual switch's 817A flow entry table 818A. The rule matches the DMAC VM address for VM T4 895B. The action pushes the DTORS link label TORS:VS 801C:827B LL onto traffic packets sent by VM T3 890C to VM T4 895B, then forwards the packet to the TORS 801A. At point F, the CNM 860 returns the ARP reply to the virtual switch 817A which forward the reply to VM T3 890C.

In one embodiment, the CNM 860 installs the TORS-VS rules and actions into the TORS's 801 flow entry table (not shown) prior to returning an ARP reply to the VM. If the cloud network 870 is an MPLS network, rules for LSPs between the TORS within the cloud network 870 switch fabric do not need to be installed when the ARP reply is returned. If the cloud network 870 switches additionally support OpenFlow, the CNM 860 need only install MPLS forwarding rules into the higher level cloud network 870 switches using OpenFlow at the time a new TORS is installed or an existing TORS is decommissioned. If, however, the higher level data center switches do not support OpenFlow, the TORS instead use LDP to set up LSPs between itself and the other TORS, and the LSPs should be configured. The cloud network 870 switches do not need to support IP routing protocols nor do they need to perform routing.

Table 1 illustrates the rule structure of an OpenFlow flow table of a TORS, for the portion of the flow table that deals with traffic being routed to a destination TORS, i.e. outgoing traffic and traffic with destination servers in the current rack according to embodiments of the invention. The rule structure for incoming traffic is further explained later. There is a flow rule in the table for each DTORS (destination TORS)-DVS (destination virtualized server) link label currently in use as a destination by a source VM in the rack. The TORS may additionally cache some flow rules to catch incoming traffic when a VM moves. Traffic coming from the source VMs in rack is routed by matching the MPLS DTORS link label that was pushed by the virtual switch, and actions associated with the rule are activated and applied to the packet. Actions differ depending on the nature of the cloud network.

TABLE 1

| Link Label | Other Fields | Action |
| --- | --- | --- |
| TORS:VS 801C:827B LL | ... | Cloud Network Specific Action |
| TORS:VS 801A:817A LL | ... | Cloud Network Specific Action |

If the cloud network is not an MPLS network, the TORS adapts traffic to the cloud network through OpenFlow virtual ports. A virtual port associated with the actions on flow matching rules processes packets and adds any headers necessary to route the packet into the cloud network. For example, if the network is an optical circuit-switched network, the virtual port may route it through an optical cross connect. One of skill in the art would understand that other types of cloud networks would utilize other adaptation virtual ports.

If, however, the cloud network is an MPLS network then exemplary actions are shown in Table 2. Each action pushes a STORS to DTORS routing label, then sends the packet to an OpenFlow SELECT group. The SELECT group uses Equal Cost Multicast (ECMP) or some other load balancing algorithm to select one output port bucket from the output ports bucket list and forwards the packet to the output port. Load balancing helps avoid congestion and facilitates multi-path utilization of all routes between the two TORS.

TABLE 2

| Link Label | Other Fields | Action |
| --- | --- | --- |
| TORS:VS 801C:827B LL | ... | Push S->D Label; Route Label |
| TORS:VS 801A:817A LL | ... | Push S->D Label; Route Label |

Once the packet reaches the destination TORS, it is routed through the OpenFlow flow tables such as shown in Tables 3 and 4. Assuming the packet has a label of "LABEL-N" at the destination TORS, the rules match the DTORS routing label "LABEL-N" indicating that the packet is destined for this TORS. The action pops the DTORS routing label and sends the packet to Table 4 for processing. The Table 4 rule matches the TORS-VS label for servers in the rack, indicating to which virtualized server the packet is destined. The action forwards the packet out the appropriate port for reaching that virtualized server.

TABLE 3

| Link Label | Other Fields | Action |
| --- | --- | --- |
| LABEL-N | . . . | Pop S->D Label; Route Label |
| LABEL-X | . . . | Push S->D Label; Route Label |

TABLE 4

| Link Label | Other Fields | Action |
| --- | --- | --- |
| TORS:VS 801C:827B LL . . . | | Route Packet to Virtual Switch 827B |
| TORS:VS 801A:817A LL | . . . | Push S->D Label; Route Label |

At the virtual switch 827B, the rule that matches the VM T4's 827B MAC address and the VS-TORS routing label is triggered. The VS-TORS routing label is popped and the packet is forwarded to the VM T4 827B.

One of the most difficult aspects of cloud networking is dealing with the movement of a VM from a first virtualized server to a second virtualized server. The CEM can, at any time, move a VM from one server to another. The movement may be made to optimize server utilization, reduce power consumption or heat generation, or to position the VM closer to access to an external resource, such as a database. When such a movement occurs, the routes to the VM at the old server are no longer valid. Packets "in flight" while the VM is moved can be dropped and new packets may not reach the VM's new location, unless measures are taken to fix up the routes.

Figure 9:
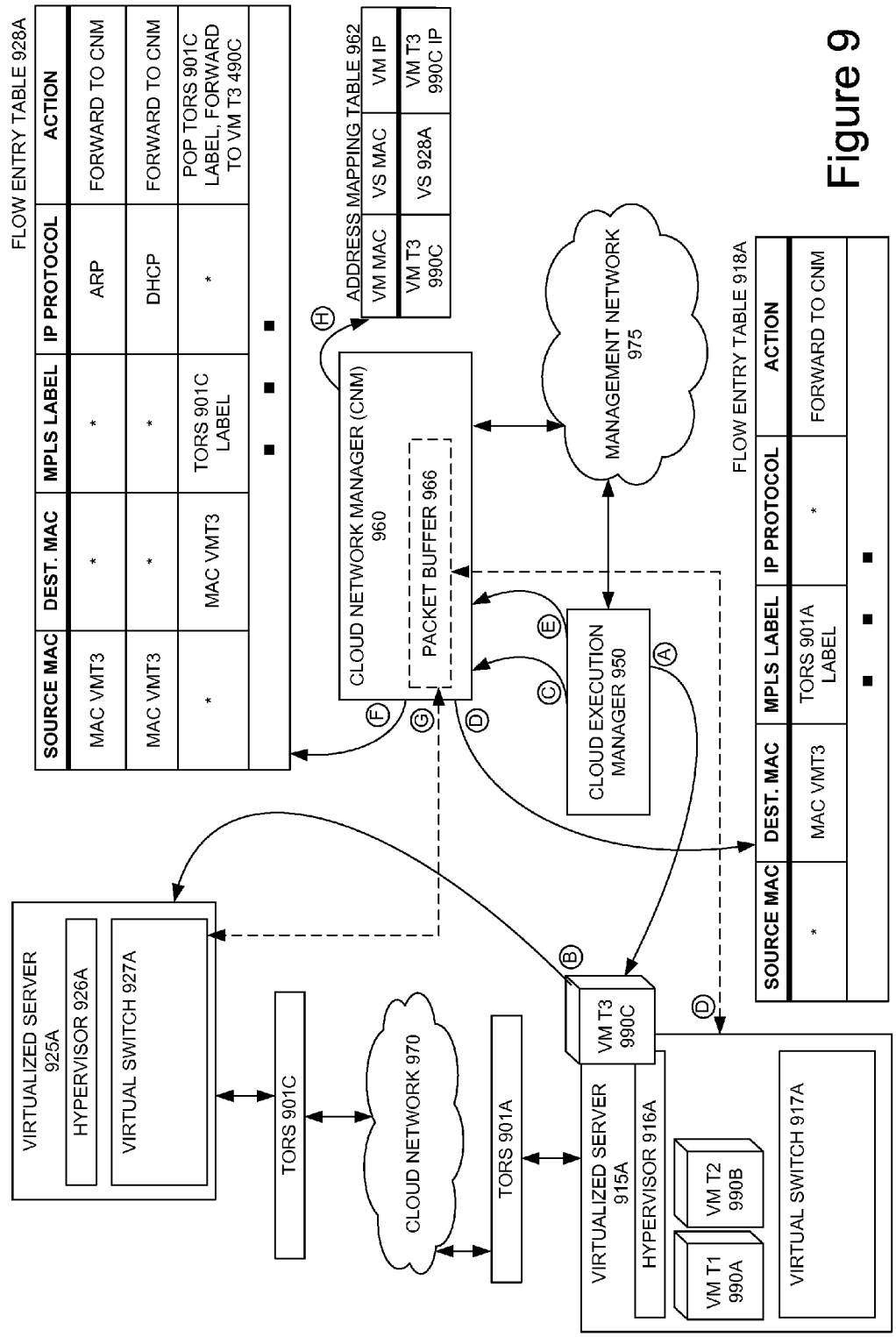
FIG. 9 illustrates a method of moving a VM from a first virtualized server to a second virtualized server in cloud computing network.

FIG. 9 illustrates a method of moving a VM from a first virtualized server to a second virtualized server in cloud computing network. In FIG. 9 a first virtualized server 915A (also referred to as the old virtualized server) is coupled with a TORS 901A that is coupled to a cloud network 970. The cloud network 970 couples the TORS 901A with another TORS 901C which is coupled to a second virtualized server 925A (also referred to as the new virtualized server).

Each virtualized server 915A and 925A are configured to run a plurality of VMs and comprise a corresponding hypervisor 916A and 926A and an MPLS enabled virtual switch 917A and 927A. Each virtual switch 917A and 927A comprises a flow entry table 918A and 928A that includes MPLS rules to indicate how the corresponding virtual switch should process packets it receives. The specific entries used for the movement of a VM will be discussed in detail below. Prior to the illustration of FIG. 9, the old virtualized server 915A has three active VMs: VM T1 990A, VM T2 990B, and VM T3 990C. FIG. 9 further illustrates a CEM 950 coupled with a CNM 960 through a management network 975. The management network further couples the CEM 950 and CNM XN60 with the TORSs 915A and 925A thereby providing communication paths to the virtualized servers 915A and 925A.

This figure illustrates various points during the movement of the VM T3 990C from the old virtualized server 915A to the new virtualized server 925A. The terms old virtualized server and new virtualized serer are reflective of the fact that prior to the movement VM T3 990C was active at the old virtualized server and after the movement VM T3 990C will be active at the new virtualized server 925A.

At point A, the CEM 950 begins moving begins moving VM T3 990C from the old virtualized server 915A to the new virtualized server 925A. Point A indicates a message being transmitted from the CEM 950 to the old virtualized server 915A indicating that a move of 9 T3 990C is being initiated. As long as VM T3 990C is active on the old virtualized server 915A then VM T3 990C can continue servicing traffic and the old flow rules are maintained in the flow entry table 918A. The hypervisor 916A prepares VM T3 990C for transfer to the new virtualized server 925A by saving the VM T3's 990C state information and directing the VM T3 990C to enter a standby or inactive state. At point B, the VM T3's 990C state information is transferred from the old virtualized server 915A to the new virtualized server 925A.

At some point, point C, during the deactivation of VM T3 990C, the CEM 950 decides that VM T3 990C can no longer service traffic. At this time, the CEM 950 notifies the CNM 960 that VM T3 990C cannot service traffic at this time because VM T3 990C is being moved. In reaction to this message, the CNM 960 modifies rules in the virtual switch's 917A flow entry table 918A. Thus, at point D, the CNM 960 installs a rule in the flow entry table 918A indicating that traffic matching VM T3's 990C MAC address as the destination MAC with a MPLS label linking the virtualized server 915A with the TORS 901A should be forwarded to the CNM 960 (or to some other entity). The CNM 960, or optionally some other entity, will provide intelligence with how to deal with traffic directed to the old virtualized server 915A meant for VM T3 990C.

In one embodiment, the CNM 960, or some other entity designed for this purpose, comprises a packet buffer 966 used to store packets meant for VM T3 990C during the transition period. In this way, packets in the packet buffer 966 meant for VM T3 990 can be sent to VM T3 990 once it is active at the new virtualized server 925A.

In one embodiment, when VM T3 990 is ready to service data at the new virtualized server 925A, the CEM 950 notifies CNM 960 that VM T3 990 is active again at point E. In another embodiment, the CNM 960 can detect that the VM T3 990 is active because the CNM 960 has received a packet (such as an ARP request) that originated from the VM T3 990 after it was reactivated. The CNM 960 reacts the VM T3 990 being ready to service data by modifying the flow entry table 928A.

At point F, the CNM 960 adds one or more entries to flow entry table 928A. The CNM 960 adds a flow rule to the flow entry table 928A that matches VM T3's 990C MAC address as the destination MAC along with matching an MPLS label linking the virtualized server 925A with the TORS 901C. This rule informs the virtual switch 927A that matching packets should have the MPLS label popped off and be forwarded to VM T3 990C. Other embodiments of the invention support additional rules. For example, one embodiment adds a rule indicating that DHCP packets originating from VM T3 990C should be forward to CNM 960. Another embodiment adds a rule indicating that ARP request originating from VM T3 990C should be forward to CNM 960.

At point G, the CNM 960 (or some other entity designed to buffer packets during the transition of VM from an old virtualized server to a new virtualized server) forwards accumulated packets destined for VM T3 990C to the virtualized server 925A so those packets may be delivered to VM T3 990C.

At point G, the CNM 960 modifies the CNM's 960 address mapping table 962 table to change the virtualized server MAC address entry for VM T3 990C to the destination new virtualized server's 925A MAC address. After these changes, any new ARP requests for VM T3's 990C in accordance with FIG. 7 will result in flow entry at the source virtual switch indicated traffic should be routed to 925A.

In one embodiment, the CNM 960 keeps the flow rule in place on the old virtualized server's 915A virtual switch 917A for any peer VMs that may still be exchanging traffic with VM T3 990C as those peer VMs may still expect VM T3 990C to be active on the old virtualized server 915A. If such a peer VM should send a peer data packet to VM T3 990C, it will be forwarded to the CNM 960 according to the rule installed at point D. The CNM 960 then modifies a flow rule on the peer VM'S virtualized server to forward traffic to VM T3 990C on the new virtualized server 925A using the MAC and IP address on the packet to locate the VM T3 990C. The CNM 960 forwards the peer data packet along to VM T3 990C on the new virtualized server 925A. In this way, all flow rules ultimately either time out or are modified to send traffic to VM T3 990C on the new virtualized server 925A. The CNM can allow the source virtual switch flow rules to time out after a predetermined grace period.

Figure 10:
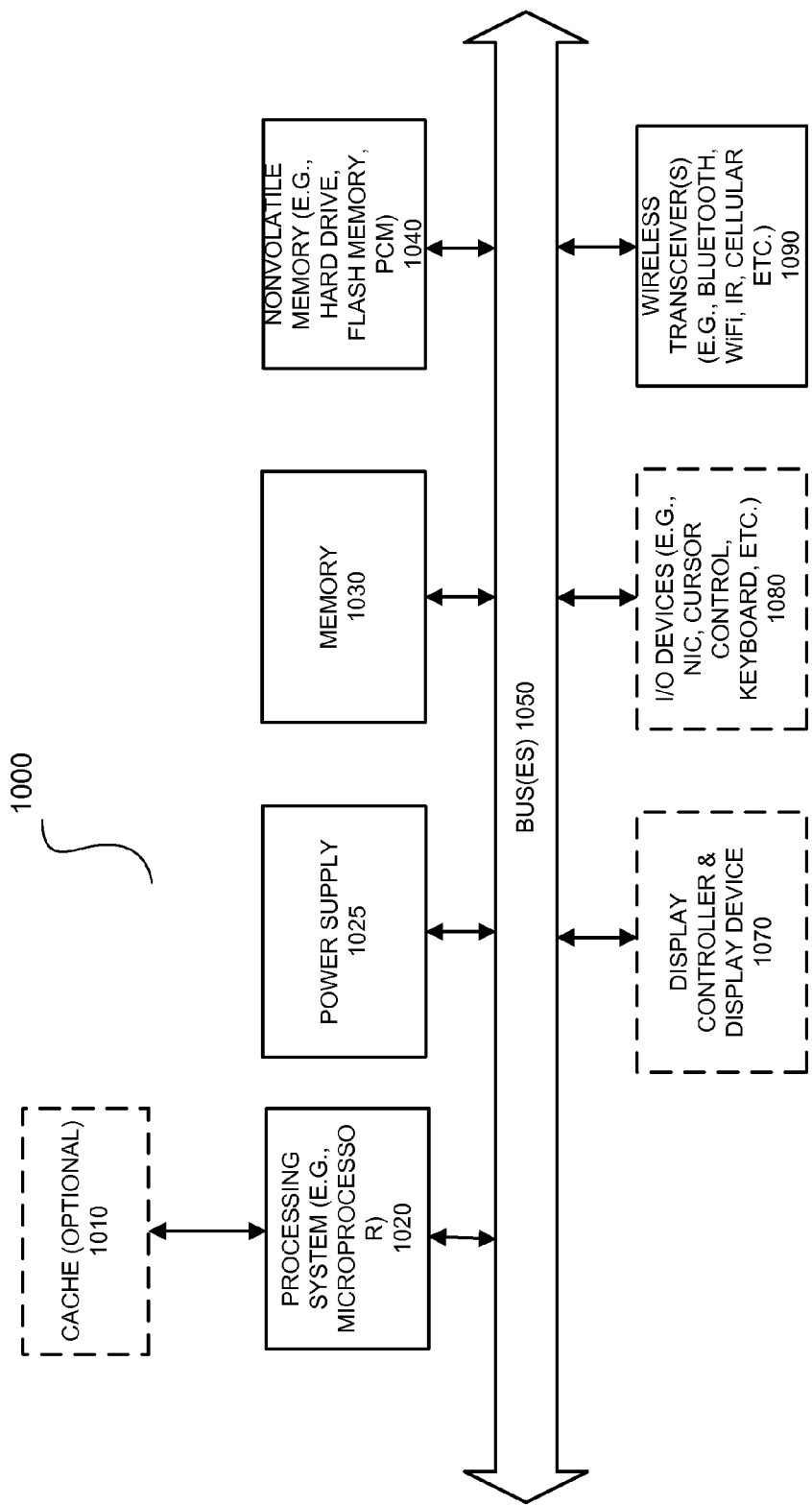
FIG. 10 illustrates a block diagram of an exemplary computer system according to embodiments of the invention.

FIG. 10 illustrates a block diagram of an exemplary computer system according to embodiments of the invention. The exemplary computer system 1000 in FIG. 10 can be used to implement the TORS 101A, the virtualized server 105A, the CEM 150, or the CNM 160. Those skilled in the art would recognize that other computer systems used to implement these devices may have more or less components and may be used to in embodiments of the invention.

The computer system 1000 includes a bus(es) 1050 which is coupled with a processing system 1015, a power supply 1020, volatile memory 1025 (e.g., double data rate random access memory (DDR-RAM), single data rate (SDR) RAM), nonvolatile memory 1030 (e.g., hard drive, flash memory, Phase-Change Memory (PCM). The processing system 1015 may be further coupled to a processing system cache 1010. The processing system 1015 may retrieve instruction(s) from the volatile memory 1025 and/or the nonvolatile memory 1030, and execute the instruction to perform operations described above. The bus(es) 1050 couples the above components together and further couples a display controller 1070, one or more input/output devices 1080 (e.g., a network interface card, a cursor control (e.g., a mouse, trackball, touchscreen, touchpad, etc.), a keyboard, etc.), and, optionally, one or more wireless transceivers (e.g., Bluetooth, WiFi, Infrared, etc.). In one embodiment, the display controller 1070 is further coupled to a display device 1075.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a cloud network manager ("CNM") to manage multi-protocol label switching ("MPLS") flow entries in a cloud network, the CNM coupled to a first virtualized server for hosting one or more virtual machines ("VM"), wherein the first virtualized server comprises a first virtual switch that supports MPLS and the first virtual switch is coupled to a first top of rack switch ("TORS") that supports MPLS, the method comprising the steps of:

receiving a first notification message, wherein the first notification message indicates that a first VM has been scheduled for activation on the first virtualized server; and in response to receiving the first notification message, performing the following steps:

determining a first VM media access control ("MAC") address associated with the first VM, determining a first virtual switch MAC address associated with the first virtual switch, recording, in an address mapping table, an association between the first VM MAC address and the first virtual switch MAC address, determining a first MPLS label that associates the first TORS with the first virtual switch, and sending a first flow entry modification message to the first virtual switch indicating that data packets matching the first MPLS label and the first VM MAC address should be forwarded to the first VM.

2. The method of claim 1, further comprising sending a second flow entry modification message to the first virtual switch in response to receiving the first notification message, the second flow entry modification message indicating that dynamic host control protocol ("DHCP") messages originating from the first VM MAC address should be forwarded to the CNM.

3. The method of claim 2, further comprising the steps of:
   receiving a DHCP request originating from the first VM;
   relaying the DHCP request to a DHCP server;
   receiving a DHCP reply from the DHCP server;

recording, in the address mapping table, an association between the first VM MAC address and a first internet protocol ("IP") address included within the DHCP reply; and forwarding the DHCP reply to the first VM.

4. The method of claim 1, further comprising sending a second flow entry modification message to the first virtual switch in response to receiving the first notification message, the second flow entry modification message indicating that address resolution protocol ("ARP") messages originating from the first VM MAC address should be forwarded to the CNM.

5. The method of claim 4, further comprising the steps of:
receiving an ARP request originating from the first VM;
determining a destination IP address from the ARP request;
determining, from the address mapping table, a destination VM MAC address and a destination virtual switch MAC address each corresponding with the destination IP address;
determining a destination MPLS label corresponding with the destination virtual switch MAC address;
sending a third flow entry modification message to the first virtual switch indicating that data packets matching the destination VM MAC address should have the destination MPLS label pushed on and forwarded to the first TORS;
generating an ARP reply indicating the destination VM MAC address corresponds with the destination IP address; and
forwarding the ARP reply to the first VM.

6. The method of claim 1, further comprising the steps of:
receiving a second notification message, the second notification message indicating that the first VM is moving to a second virtualized server and is unable to service data packets, wherein the second virtualized server comprises a second virtual switch that supports MPLS and the second virtual switch is coupled to a second TORS that supports MPLS;
sending, in response to the second notification message, a second flow entry modification message to the first virtual switch indicating that data packets matching the first MPLS label and the first VM MAC address should be forwarded to the CNM;
receiving a move complete indication that indicates that the first VM has moved to the second virtualized server and is able to service data packets; and
in response to the move complete indication, performing the steps of:
determining a second virtual switch MAC address associated with the second virtual switch,
recording, in the address mapping table, an association between the first VM MAC address and the second virtual switch MAC address,
determining a second MPLS label that links the second TORS with the second virtual switch,
sending a third flow entry modification message to the second virtual switch indicating that data packets matching the second MPLS label and the first VM MAC address should be forwarded the first VM, and
updating the address mapping table to associate the first VM with the second virtual switch and disassociate the first VM from the first virtual switch.

7. The method of claim 6 further comprising the steps of:
causing one or more data packets destined for the first VM MAC address to be buffered in response to the second notification message; and causing the one or more buffered data packets to be forwarded to the first VM in response to the move complete indication.

8. The method of claim 6, further comprising the steps of:
receiving a peer data packet matching the first MPLS label and the first VM MAC address, wherein the peer data packet originated from a peer VM hosted by a peer virtualized server comprising a peer virtual switch that supports MPLS and that is coupled to a peer TORS that supports MPLS;
determining a peer VM MAC address from the peer data packet;
determining the peer virtual switch from the peer VM MAC address;
forwarding the peer data packet to the first VM; and
sending a fourth flow entry modification message to the peer virtual switch indicating that data packets destined for the first VM MAC address should have the second MPLS label pushed on and forwarded to the peer TORS, whereby subsequent data packets from the peer VM destined for the first VM will be forwarded to the second virtual switch.

9. A system for managing a multi-protocol label switching ("MPLS") cloud network comprising:
a plurality of top of rack switches ("TORS");
a plurality of virtualized servers, each virtualized server coupled to one of the plurality of TORSs and comprising:
a hypervisor configured to execute one or more virtual machines ("VM") on the virtualized server, and
a virtual switch configured to support MPLS and to transmit data packets from the one or more VMs to the TORS coupled with this virtualized server;
a cloud execution manager ("CEM") coupled to the plurality of virtualized servers and configured to:
schedule execution of the one or more VMs, each VM to be executed on one of the plurality of virtualized servers,
suspend execution of the one or more VMs, and
move execution of the one or more VMs from one of the plurality of virtualized servers to another one of the plurality of virtualized servers; and
a cloud network manager ("CNM") coupled to the plurality of TORSs, the plurality of virtualized servers, and the CEM, the CNM configured to:
receive a first notification message from the CEM, wherein the first notification message is to indicate that a first VM has been scheduled for activation on a first of the plurality of virtualized servers;
in response to the first notification message:
determine a first VM media access control ("MAC") address associated with the first VM,
determine a first virtual switch MAC address associated with the first virtual switch in the first virtualized server,
record, in an address mapping table, an association between the first VM MAC address and the first virtual switch MAC address,
determine a first MPLS label to associate a first TORS with the first virtual switch, wherein the first TORS is to be coupled with the first virtualized server, and
send a first flow entry modification message to the first virtual switch to indicate that data packets that match the first MPLS label and the first VM MAC address should be forwarded the first VM.

10. The system of claim 9, wherein the CNM is further configured to send a second flow entry modification message to the first virtual switch in response to the first notification message, the second flow entry modification message to indicate that dynamic host control protocol ("DHCP") messages that originate from the first VM MAC address should be forwarded to the CNM.

11. The system of claim 10, wherein the CNM is further configured to:
receive a DHCP request that originated from the first VM;
relay the DHCP request to a DHCP server;
receive a DHCP reply from the DHCP server;
record, in the address mapping table, an association between the first VM MAC address and a first internet protocol ("IP") address included within the DHCP reply; and
forward the DHCP reply to the first VM.

12. The system of claim 9, wherein the CNM is further configured to send a second flow entry modification message to the first virtual switch in response to the first notification message, the second flow entry modification message to indicate that address resolution protocol ("ARP") messages that originate from the first VM MAC address should be forwarded to the CNM.

13. The system of claim 12, wherein the CNM is further configured to:
receive an ARP request that originated from the first VM;
determine a destination IP address from the ARP request;
determine, from the address mapping table, a destination VM MAC address and a destination virtual switch MAC address each to correspond with the destination IP address;
determine a destination MPLS label to correspond with the destination virtual switch MAC address;
send a third flow entry modification message to the first virtual switch to indicate that data packets that match the destination VM MAC address should have the destination MPLS label pushed on and be forwarded to the first TORS;
generate an ARP reply to indicate the destination VM MAC address is to correspond with the destination IP address; and
forward the ARP reply to the first VM.

14. The system of claim 9, wherein the CNM is further configured to:
receive a second notification message, the second notification message to indicate that the first VM is to be moved to a second of the plurality of virtualized servers and will be unable to service data packets;
send, in response to the second notification message, a second flow entry modification message to the first virtual switch to indicate that data packets that match the first MPLS label and the first VM MAC address should be forwarded to the CNM;
receive a move complete indication to indicate that the first VM moved to the second virtualized server and will be able to service data packets; and
in response to the move complete indication, the CNM further configured to:
determine a second virtual switch MAC address to be associated with a second virtual switch,
record, in the address mapping table, an association between the first VM MAC address and the second virtual switch MAC address,
determine a second MPLS label to associate a second TORS with the second virtual switch, wherein the second TORS is to be coupled with the second virtualized server,
send a third flow entry modification message to the second virtual switch to indicate that data packets that match the second MPLS label and the first VM MAC address should be forwarded the first VM, and
update the address mapping table to associate the first VM with the second virtual switch and disassociate the first VM from the first virtual switch.

15. The system of claim 14, wherein the CNM is further configured to:
cause one or more data packets destined for the first VM MAC address to be buffered in response to the second notification message; and
cause the one or more buffered data packets to be forwarded to the first VM in response to the move complete indication.

16. The system of claim 14, wherein the CNM is further configured to:
receive a peer data packet that matches the first MPLS label and the first VM MAC address, wherein the peer data packet originated from a peer VM hosted by a third of the plurality of virtualized servers;
determine a peer VM MAC address from the peer data packet;
determine a peer virtual switch from the peer VM MAC address, wherein the third virtualized server comprises the peer virtual switch;
forward the peer data packet to the first VM; and
send a fourth flow entry modification message to the peer virtual switch to indicate that data packets destined for the first VM MAC address should have the second MPLS label pushed on and forwarded to a peer TORS, whereby subsequent data packets from the peer VM destined for the first VM will be forwarded to the second virtual switch.

17. A cloud network manager ("CNM") for managing multi-protocol label switching ("MPLS") flow entries in a cloud network, the CNM coupled to a first virtualized server for hosting one or more virtual machines ("VM") wherein the first virtualized server comprises a first virtual switch that supports MPLS and the first virtual switch is coupled to a first top of rack switch ("TORS") that supports MPLS, the CNM configured to:
receive a first notification message, wherein the first notification message is to indicate that a first VM has been scheduled for activation on the first virtualized server; and
in response to the first notification message, the CNM further configured to:
determine a first VM media access control ("MAC") address associated with the first VM,
determine a first virtual switch MAC address associated with the first virtual switch,
record, in an address mapping table, an association between the first VM MAC address and the first virtual switch MAC address,
determine a first MPLS label to associate the first TORS with the first virtual switch, and
send a first flow entry modification message to the first virtual switch to indicate that data packets that match the first MPLS label and the first VM MAC address should be forwarded the first VM.

18. The CNM of claim 17, wherein the CNM is further configured to send a second flow entry modification message to the first virtual switch in response to the first notification message, the second flow entry modification message to indicate that dynamic host control protocol ("DHCP") messages that originate from the first VM MAC address should be forwarded to the CNM.

19. The CNM of claim 18, wherein the CNM is further configured to:
   receive a DHCP request that originated from the first VM;
   relay the DHCP request to a DHCP server;
   receive a DHCP reply from the DHCP server;
   record, in the address mapping table, an association between the first VM MAC address and a first internet protocol ("IP") address included within the DHCP reply; and
   forward the DHCP reply to the first VM.

20. The CNM of claim 17, wherein the CNM is further configured to send a second flow entry modification message to the first virtual switch in response to the first notification message, the second flow entry modification message to indicate that address resolution protocol ("ARP") messages that originate from the first VM MAC address should be forwarded to the CNM.

21. The CNM of claim 20, wherein the CNM is further configured to:
   receive an ARP request that originated from the first VM;
   determine a destination IP address from the ARP request;
   determine, from the address mapping table, a destination VM MAC address and a destination virtual switch MAC address each to correspond with the destination IP address;
   determine a destination MPLS label to correspond with the destination virtual switch MAC address;
   send a third flow entry modification message to the first virtual switch to indicate that data packets that match the destination VM MAC address should have the destination MPLS label pushed on and be forwarded to the first TORS;
   generate an ARP reply to indicate the destination VM MAC address corresponds to the destination IP address; and
   forward the ARP reply to the first VM.

22. The CNM of claim 17, wherein the CNM is further configured to:
   receive a second notification message, the second notification message to indicate that the first VM is to move to a second virtualized server and will be unable to service data packets, wherein the second virtualized server is to comprise a second virtual switch that supports MPLS and the second virtual switch is to be coupled to a second TORS that supports MPLS;
   send, in response to the second notification message, a second flow entry modification message to the first virtual switch to indicate that data packets that match the first MPLS label and the first VM MAC address should be forwarded to the CNM;
   receive a move complete indication to indicate that the first VM has moved to the second virtualized server and will be able to service data packets; and
   in response to the move complete indication, the CNM configured to:
      determine a second virtual switch MAC address associated with the second virtual switch,
      record, in the address mapping table, an association between the first VM MAC address and the second virtual switch MAC address,
      determine a second MPLS label to link the second TORS with the second virtual switch,
      send a third flow entry modification message to the second virtual switch to indicate that data packets that match the second MPLS label and the first VM MAC address should be forwarded the first VM, and
      update the address mapping table to associate the first VM with the second virtual switch and disassociate the first VM from the first virtual switch.

23. The CNM of claim 22, wherein the CNM is further configured to:
   cause one or more data packets destined for the first VM MAC address to be buffered in response to the second notification message; and
   cause the one or more buffered data packets to be forwarded to the first VM in response to the move complete indication.

24. The CNM of claim 22, wherein the CNM is further configured to:
   receive a peer data packet that matches the first MPLS label and the first VM MAC address, wherein the peer data packet originated from a peer VM hosted by a peer virtualized server that comprises a peer virtual switch that supports MPLS and is coupled to a peer TORS that supports MPLS;
   determine a peer VM MAC address from the peer data packet;
   determine the peer virtual switch from the peer VM MAC address;
   forward the peer data packet to the first VM; and
   send a fourth flow entry modification message to the peer virtual switch to indicate that data packets destined for the first VM MAC address should have the second MPLS label pushed on and be forwarded to the peer TORS, whereby subsequent data packets from the peer VM destined for the first VM will be forwarded to the second virtual switch.

* * * * *

UNITED STATES PATENT AND TRADEMARK OFFICE
CERTIFICATE OF CORRECTION

PATENT NO. : 8,560,663 B2
APPLICATION NO. : 13/251107
DATED : October 15, 2013
INVENTOR(S) : Baucke et al.

Page 1 of 2

It is certified that error appears in the above-identified patent and that said Letters Patent is hereby corrected as shown below:

In the Drawings

In Fig. 3, Sheet 3 of 10, in Box "320", in Line 1, delete "ASSOICATION" and insert -- ASSOCIATION --, therefor.

In Fig. 5, Sheet 5 of 10, in Box "515", in Line 2, delete "ASSOICATION" and insert -- ASSOCIATION --, therefor.

In Fig. 7, Sheet 7 of 10, in Box "705", in Line 2, delete "REQUST" and insert -- REQUEST --, therefor.

In Fig. 7, Sheet 7 of 10, in Box "710", in Line 3, delete "ADDRES" and insert -- ADDRESS --, therefor.

In Fig. 10, Sheet 10 of 10,

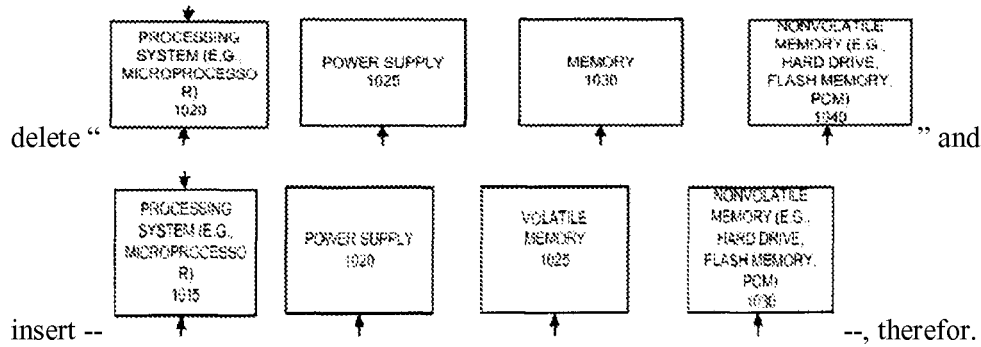

delete " ... " and insert -- ... --, therefor.

In the Specifications

In Column 4, Line 30, delete "The receives" and insert -- The CNM receives --, therefor.

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,560,663 B2

In Column 5, Line 13, delete "DESCRIPTION" and insert -- DETAILED DESCRIPTION --, therefor.

In Column 7, Line 11, delete "1008," and insert -- 100B, --, therefor.

In Column 7, Line 15, delete "1018" and insert -- 101B --, therefor.

In Column 8, Line 34, delete "a the" and insert -- the --, therefor.

In Column 11, Line 27, delete "virtualized server 816A" and
insert -- virtualized server 815A --, therefor.

In Column 12, Line 52, delete "Multicast" and insert -- Multipath --, therefor.

In the Claims

In Column 16, Line 48, in Claim 1, delete "an address" and
insert -- a record address --, therefor.